United States Patent [19]

McKay

[11] Patent Number: 5,352,280
[45] Date of Patent: Oct. 4, 1994

[54] PIGMENT AND INK COMPOSITIONS

[75] Inventor: Robert B. McKay, Crooked Holm, Scotland

[73] Assignee: Ciba-Geigy Corporation, Ardsley, N.Y.

[21] Appl. No.: 145,443

[22] Filed: Oct. 28, 1993

[30] Foreign Application Priority Data

Nov. 3, 1992 [GB] United Kingdom .............. 9223133.1

[51] Int. Cl.$^5$ .............................................. C09D 11/02
[52] U.S. Cl. .................. 106/20 C; 106/23 C; 106/400; 106/401; 106/493; 106/494; 106/496
[58] Field of Search .................. 106/20 C, 23 C, 400, 106/401, 493, 494, 496

[56] References Cited

U.S. PATENT DOCUMENTS 3,963,501  6/1976  Zalesky ............................. 100/20 C
4,565,576  1/1986  Salgo et al. ........................ 106/23 C

FOREIGN PATENT DOCUMENTS 872149   7/1961  United Kingdom .
2110228  6/1983  United Kingdom .

*Primary Examiner*—Mark L. Bell
*Assistant Examiner*—Scott L. Hertzog
*Attorney, Agent, or Firm*—Michele A. Kovaleski

[57] ABSTRACT

A lithographic printing ink containing, as colorant, a major amount of a pigment having a relatively small crystal size and a minor amount of a colored compound having a relatively larger crystal size.

11 Claims, No Drawings

PIGMENT AND INK COMPOSITIONS

The present invention relates to a printing ink composition containing diarylamide yellow pigments.

One problem associated with lithographic printing inks is that they are prone to misting on printing presses. Faster printing speeds in modem presses tend to produce more misting and this can be a health hazard. Misting consists of small particles of the ink which form an aerosol that eventually pervades the atmosphere of the press room.

Misting is a property of the ink varnish in the first instance, but is suppressed by the incorporation of pigments to form inks. In general, of the pigments used in multicolour process inks, diarylamide yellow pigments such as Pigment Yellow 12 and 13 type pigments are less effective as suppressants than Pigment Red 57:1 and Pigment Blue 15:3 pigments.

The least effective are pigments with small crystal size required for transparency e.g. highly resinareal Pigment Yellow 13 type pigments, which include mixed coupled types which are predominantly Pigment Yellow 13 itself, but with a second component such as Pigment Yellows 12,14,63 or 83 (C.I. Pigment Yellows 188,174,127 and 176).

Pigment Yellow 13 type pigments tend to have cube- to brick-shaped crystals having an average minor dimension of 0.015 to $0.04 \times 10^{-3}$ mm (assessed from X-ray diffraction line broadening). Those used for transparent yellow inks are at the lower end of this size range, typically about $0.02 \times 10^{-3}$ mm.

We have now found that if these pigments are mixed with a minor amount of a coloured compound, e.g. a pigment, having a larger crystal size, the misting tendency of an ink incorporating the mixture is much reduced and in many cases the colour strength is maintained. This is in contrast to use of extenders, such as clays or chalks, which result in loss of colour strength.

It is also known that misting can be reduced by increasing the viscosity of the ink. The inks of the present invention show reduced misting and often this is accomplished by a reduction in viscosity, making the effect all the more surprising.

Accordingly, the present invention provides a lithographic printing ink containing, as colourant, a major amount of a pigment (preferably a resinated diarylamide yellow pigment) having a relatively small crystal size and a minor amount of a coloured compound, e.g. a pigment (preferably a yellow pigment) having a relatively larger crystal size.

The amount of pigment having a relatively larger crystal size may be up to 49%, preferably up to 20% by weight of the pigment mixture, and more preferably from 5 to 20%, and most preferably from 10 to 20%.

The ink may be formulated by adding the two pigments separately, or by premixing the pigments and adding the mixture to the ink or by adding the minor component during any convenient stage of manufacture of the major component.

As a further aspect, the invention provides a mixture of a resinated diarylamide yellow pigment having a relatively small crystal size and a minor amount of a yellow pigment having a relatively larger crystal size.

The resinated diarylamide yellow pigment having a relatively small crystal size may be Pigment Yellow 12 or Pigment Yellow 13 types. These pigments may be single compounds or they may be mixed-coupled types. For instance a mixed coupled Pigment Yellow 13-type may also contain a small amount of a second compound such as Pigment Yellow 12,14,63 or 83 (C.I. Pigment Yellows 188,174,127 or 176).

The average minor dimension of the crystals may be from 0.015 to $0.030 \times 10^{-3}$ mm, preferably from 0.015 to $0.025 \times 10^{-3}$ mm, and often about $0.02 \times 10^{-3}$ mm. When the crystals are cubic, these dimensions apply to each edge of the crystals. When they are not cubic, the size of the major dimension may be only slightly larger. The average maximum dimension (distance between opposite comers) may be from 0.025 to $0.052 \times 10^{-3}$ mm.

The yellow pigment of relatively larger crystal size may be a different form of the predominant pigment, or a different pigment.

When it is a different form of a resinated pigment it may be, for instance, an unresinated form having a relatively larger crystal size. Thus resinated Pigment Yellow 12 may be used with unresinated Pigment Yellow 12, and resinated Pigment Yellow 13 may be used with unresinated Pigment Yellow 13.

The yellow pigment of relatively larger crystal size may also be a different pigment type from the predominant pigment. For example, in addition to Pigment Yellows 12 and 13 types, it may be Pigment Yellow 14,63,83,1,74,61,62 or 168, the last three being yellow metal salt pigments.

The crystal size of the relatively larger crystals may be from 0.025 to $0.5 \times 10^{-3}$ mm, i.e. the average maximum dimension may be from 0.05 to $>1 \times 10^{-3}$ mm. The crystals are advantageously plate or rod-shaped, such shapes giving more crystals per unit weight.

For example the yellow pigment of relatively larger crystal size may be a metal salt pigment with rod-shaped crystals having an average maximum crystal dimension of 0.5 to $1 \times 10^{-3}$ mm.

Some of the minor components may result in some loss of colour strength of the ink. This does not always happen. For instance the use of cube-shaped crystals of unresinated Pigment Yellow 13 with a crystal breadth (determined by X-ray diffraction line broadening) of about $0.035 \times 10^{-3}$ mm and average maximum crystal dimension of $0.06 \times 10^{-3}$ mm not only achieves a substantial improvement in mist suppression, but does so without observable loss in colour strength.

The inks of the invention may also contain one or more other additives such as extenders, gelling agents, such as amine-treated montmorillonites, and highly polar compounds, such as amines or amides.

The invention is illustrated by the following Examples.

EXAMPLE 1

12 parts of a Pigment Yellow 13-type pigment (Pigment Yellow 188) known commercially as IRGALITE Yellow LBF (containing abietyl resin at 42% w/w) are mixed with 3 parts of an unresinated Pigment Yellow 13 pigment known commercially as IRGALITE Yellow BAW (resin free) and dispersed in 85 parts of a heatset-type lithographic ink varnish by 3-roll milling. The breadths of the average crystals of LBF and BAW are respectively 0.019 and $0.035 \times 10^{-3}$ mm (maximum dimension 0.035 and $0.06 \times 10^{-3}$ mm respectively). A reference ink containing 15 parts LBF and 85 parts varnish is made in an identical way.

After dilution with varnish to a total pigment content of 12% w/w the misting tendencies of the two inks are determined under identical conditions using the distribution and brass rollers of a Rudolph Mayer Tack-o-scope instrument operating at 60° C. The best procedure entails application of 0.5 gram of ink to the distribution roller and distributing for one minute at a tangential velocity of 50 meters per minute. The speed is then increased to 330 meters per minute and mist collected on aluminium foil placed below the brass roller, and below a mask to screen out ink simply thrown off the ends of the rollers. The amount of mist is weighed using a 4-place balance. The roller chamber is covered by polythene during operation.

Six determinations are made on each ink and the results averaged. The reference ink gives 8.2 milligrams of mist on the collection area of the foil. The test ink containing the pigment mixture gives 4.0 milligrams. This 50%+reduction is unexpectedly large, considering that the amount of BAW is only 20% of the mixture of pigments.

Colouristic comparison of the 15% inks as thin films printed on a Prüfbau test printer using an 8 point comparison method shows them to be of equal colour strength.

EXAMPLE 2

Using a similar procedure to Example 1 a series of inks are prepared using mixtures of a Yellow 13 pigment known commercially as IRGALlTE Yellow BKW (containing 40% abietyl resin w/w and with crystal breadth $=0.027 \times 10^{-3}$ mm (maximum crystal dimension $=0.047 \times 10^{-3}$ mm) and Irgalite Yellow BAW as used in Example 1. Details are given in the following table.

| Parts BKW | Parts BAW | Mist (mg) |
| --- | --- | --- |
| 100 | 0 | 11 |
| 95 | 5 | 9 |
| 90 | 10 | 7.5 |
| 80 | 20 | 6 |
| 50 | 50 | 5.5 |
| 0 | 100 | 3.0 |

These results further indicate that the effect of BAW in reducing misting is disproportionately large when present as the minor component.

EXAMPLE 3

An ink containing 9.6 parts IRGALITE Yellow LBF and 2.4 parts IRGALITE Yellow G in 88 parts of a heatset-type lithographic ink varnish is prepared as in Example 1. Yellow G is a Pigment Yellow 1 type intended for paints. It has large crystal size (average maximum crystal dimension $=0.39 \times 10^{-3}$ mm, from TEM). A reference ink containing 12 parts LBF and 88 parts varnish is made in an identical manner. When tested as in Example 1 the reference and test inks give 13 and 7.5 mg mist, respectively.

EXAMPLE 4

An ink is prepared containing 10.8 parts IRGALITE Yellow LBF and 1.2 parts of IRGALITE Yellow WSR with 88 parts of a heatset-type lithographic varnish. Yellow WSR is a Pigment Yellow 62 type intended for plastics and consists of large rod-shaped crystals (average maximum dimension $=0.9 \times 10^{-3}$ mm, from TEM). A reference ink containing 12 parts LBF alone and 88 parts varnish is prepared in an identical manner. When tested as in Example 1, the reference and test inks give 9.8 and 4.6 mg mist, respectively.

EXAMPLE 5

Example 4 is repeated but with Yellow WSR replaced by IRGALITE Yellow WGP. Yellow WGP is a Pigment Yellow 168 type with large rod-shaped crystals slightly larger than those of Yellow WSR. When tested as in Example 1, the reference and test inks give 9.8 and 5.5 mg mist, respectively.

EXAMPLE 6

An ink is prepared by 3-roll milling 19 parts of IRGALITE Yellow LBF and 1 part IRGALITE Yellow WSR in a commercial heatset lithographic varnish of a type different from that in Example 4. A reference ink containing 20 parts of LB F and 80 parts varnish is prepared in an identical manner. The inks are then diluted to 12 parts (total) pigment and 88 parts varnish. When tested as in Example 1, the reference and test inks give 12.0 and 5.8 mg mist respectively.

EXAMPLE 7

An ink is prepared by 3-roll milling 22.5 parts IRGALITE Yellow LBS and 2.5 parts IRGALITE Yellow BAW in 75 parts of a low tack, sheetfed lithographic varnish. Yellow LBS is a Pigment Yellow 13-type pigment (Pigment Yellow 174) with average maximum crystal dimension $=0.035 \times 10^{-3}$ mm. A reference ink is prepared using 25 parts LBS alone. The inks are diluted with varnish to 14.5 parts (total pigment and 85.5 parts varnish). Misting is assessed using 1 g of ink distributed on the Tack-o-scope rollers at 50° C. and a tangential speed of 250 m/min. Mist is collected on a white paper sheet placed below the rollers. The test ink gives little misting, much less that the reference ink, as assessed visually from the intensity of colouration on the paper.

I claim:

1. A lithographic printing ink containing a varnish and as colourant, a major amount of a pigment having a small crystal size of 0.015 to 0.052 mm and a minor amount of a coloured compound having a larger crystal size of 0.025 to 0.5 mm.

2. An ink as claimed in claim 1 in which the amount of said coloured compound is up to 20% by weight of the pigment mixture.

3. An ink as claimed in claim 2 in which the amount of said coloured compound is from 10 to 20% by weight of the pigment mixture.

4. An ink as claimed in claim 1 in which said coloured compound is a pigment.

5. An ink as claimed in claim 1 in which the pigment having a relatively small crystal size has crystals with an average minor dimension of from 0.015 to $0.025 \times 10^{-3}$ mm.

6. An ink as claimed in claim 1 in which said pigment having a relatively small crystal size is a resinated diarylamide yellow pigment.

7. An ink as claimed in claim 6 in which the resinated diarylamide pigment is Pigment Yellow 12 or Pigment Yellow 13, either as single pigments or as mixed-coupled pigments.

8. An ink as claimed in claim 1 in which the coloured compound of relatively larger crystal size is Pigment Yellow 12,13,14,63,83,1,74,61 or 62.

9. An ink as claimed in claim 1 in which the crystal size of the relatively larger crystals is from 0.025 to $0.2 \times 10^{-3}$ mm.

10. An ink as claimed in claim 1 in which the coloured compound of relatively larger crystal size is unresinated Pigment Yellow 13 having a crystal breadth of about $0.035 \times 10^{-3}$ mm.

11. A pigment composition comprising a major amount of a pigment having a small crystal size of 0.015 to 0.052 mm and a minor amount of a coloured compound having a larger crystal size of 0.025 to 0.5 mm.

* * * * *

UNITED STATES PATENT AND TRADEMARK OFFICE
CERTIFICATE OF CORRECTION

PATENT NO. : 5,352,280
DATED : October 4, 1994
INVENTOR(S) : Robert B. McKay

It is certified that error appears in the above-indentified patent and that said Letters Patent is hereby corrected as shown below:

Claim 1, line 3    after "0.052"

insert -- X $10^{-3}$ -- so the line reads    ... 0.015 to 0.052 x $10^{-3}$mm...

Claim 1, line 5    after "0.5"

insert -- X $10^{-3}$ -- so the line reads    ... 0.025 to 0.5 x $10^{-3}$mm.

Claim 11, line 3    after "0.052"

insert -- X $10^{-3}$ -- so the line reads    .... 0.015 to 0.052 x $10^{-3}$mm....

Claim 11, lines 4-5    after "0.5"

insert -- X $10^{-3}$ -- so the lines read    ...0.025 to 0.5 x $10^{-3}$mm.

Signed and Sealed this

Twenty-second Day of October, 1996

Attest:

BRUCE LEHMAN

Attesting Officer    Commissioner of Patents and Trademarks